United States Patent
Gubbi Lakshminarasimha et al.

(10) Patent No.: US 12,412,383 B2
(45) Date of Patent: Sep. 9, 2025

(54) METHOD AND SYSTEM FOR SCENE GRAPH GENERATION

(71) Applicant: Tata Consultancy Services Limited, Mumbai (IN)

(72) Inventors: Jayavardhana Rama Gubbi Lakshminarasimha, Bangalore (IN); Vivek Bangalore Sampathkumar, Bangalore (IN); Rajan Mindigal Alasingara Bhattachar, Bangalore (IN); Balamuralidhar Purushothaman, Bangalore (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 336 days.

(21) Appl. No.: 18/216,119

(22) Filed: Jun. 29, 2023

(65) Prior Publication Data
US 2024/0020962 A1    Jan. 18, 2024

(30) Foreign Application Priority Data
Jul. 18, 2022    (IN) .............................. 202221041051

(51) Int. Cl.
*G06V 10/00* (2022.01)
*G06V 10/42* (2022.01)
*G06V 10/82* (2022.01)

(52) U.S. Cl.
CPC .............. *G06V 10/82* (2022.01); *G06V 10/42* (2022.01)

(58) Field of Classification Search
CPC .... G06V 10/82; G06V 10/42; G06V 10/7715; G06V 20/70; G06N 3/0464; G06N 3/045; G06N 3/08
See application file for complete search history.

(56) References Cited

U.S. PATENT DOCUMENTS

| | | | |
|---|---|---|---|
| 2021/0374489 A1* | 12/2021 | Prakash | G06V 20/70 |
| 2023/0103305 A1* | 4/2023 | Xu | G06F 40/205 |
| | | | 382/156 |

FOREIGN PATENT DOCUMENTS

CN    112464016 B    4/2022

OTHER PUBLICATIONS

Lin et al., Divide and Conquer: Subset Matching for Scene Graph Generation in Complex Scenes, IEEE Access, vol. 10 (Year: 2022).*

(Continued)

*Primary Examiner* — Xiao Liu
(74) *Attorney, Agent, or Firm* — Finnegan, Henderson Farabow, Garrett & Dunner, LLP (57) ABSTRACT

The disclosure generally relates to scene graph generation. Scene graph captures rich semantic information of an image by representing objects and their relationships as nodes and edges of a graph and has several applications including image retrieval, action recognition, visual question answering, autonomous driving, robotics. However, to leverage scene graphs, computationally efficient scene graph generation methods are required, which is very challenging to generate due presence of a quadratic number of potential edges and computationally intensive/non-scalable techniques for detecting the relationship between each object pair using the traditional approach. The disclosure proposes a combination of edge proposal neural network and the Graph neural network with spatial message passing (GNN-SMP) along with several techniques including a feature extraction technique, object detection technique, un-labelled graph generation technique and a scene graph generation technique to generate scene graphs.

15 Claims, 7 Drawing Sheets

(56) References Cited

OTHER PUBLICATIONS

Xu et al, Scene Graph Generation by Iterative Message Passing, 2017 IEEE Conference on Computer Vision and Pattern Recognition (CVPR) (Year: 2017).*
Cong et al., "Spatial-Temporal Transformer for Dynamic Scene Graph Generation," (2021).
Li et al., "SGTR: End-to-end Scene Graph Generation with Transformer," (2022).
Lin et al., "Divide and Conquer: Subset Matching for Scene Graph Generation in Complex Scenes," (2022).

* cited by examiner

METHOD AND SYSTEM FOR SCENE GRAPH GENERATION

PRIORITY CLAIM

This U.S. patent application claims priority under 35 U.S.C. § 119 to: India Application No. 202221041051, filed on 18 Jul. 2022. The entire contents of the aforementioned application are incorporated herein by reference.

TECHNICAL FIELD

The disclosure herein generally relates to scene graphs, and, more particularly, a method and a system for scene graph generation.

BACKGROUND

Scene graph is a data structure that represents contents of a scene/environment, as a graph. The scene graph captures rich semantic information of the scene and enables holistic understanding and reasoning over the images. The scene graph comprises of several nodes, edges and attributes. The nodes of the scene graph represent the objects in the scene, and the edges of the scene graph represent the relationship between these objects. Further, these nodes are associated with objects in the image via regions of interest (bounding boxes).

The scene graph representation is used in several computer applications including autonomous driving, robotics etc. The scene graph representation improves the performance of various computer vision tasks such as image retrieval, action recognition, and visual question answering. One major challenge that limits the usage of scene graphs into downstream tasks is the computational load associated with scene graph classification task and in turn on a module that handles the scene graph classification task. The presence of a quadratic number of potential edges poses a major challenge in the scene graph classification task, thus is computationally complex. Also, detecting the relationship between each object pair using the traditional approaches is computationally intensive and non-scalable. Further, the efficiency of a scene graph generation method depends on the grounding and graph labeling process.

Considering the above-mentioned challenges, a scene graph representation can be used in several computer vision applications provided the scene graph generation methods are computationally efficient. Hence there is a need for a computationally simple and efficient technique for scene graph generation methods.

SUMMARY

Embodiments of the present disclosure present technological improvements as solutions to one or more of the above-mentioned technical problems recognized by the inventors in conventional systems. For example, in one embodiment, a method for scene graph generation is provided.

The system includes a memory storing instructions, one or more communication interfaces, and one or more hardware processors coupled to the memory via the one or more communication interfaces, wherein the one or more hardware processors are configured by the instructions to receive a plurality of inputs, via one or more hardware processors, wherein the plurality of inputs is associated with an image of a scene. The system is further configured for extracting a plurality of spatial features of the image, via the one or more hardware processors, based on a feature extraction technique. The system is further configured for detecting a plurality of objects in the image, via the one or more hardware processors, using the plurality of spatial features based on an object detection technique, wherein the object detection technique comprises: localizing a set of bounding boxes in the image using the plurality of spatial features based on a bounding box technique; and extracting a first object embedding from each bounding box from the set of bounding boxes using the plurality of spatial features based on an object embedding technique, wherein a plurality of objects are represented using the set of bounding boxes and the first object embedding. The system is further configured for predicting a set of edge representations for the plurality of objects, via the one or more hardware processors, using the plurality of spatial features based on a trained edge proposal neural network. The system is further configured for generating an un-labelled graph, via the one or more hardware processors, based on an un-labelled graph generation technique, wherein the generation of the un-labelled graph comprises: generating a basic graph based on the set of bounding boxes and the set of edge representations using a linear assignment method and generating the un-labelled graph based on the basic graph using the plurality of objects, wherein the un-labelled graph comprises of a plurality of un-labelled objects and a plurality of un-labelled edges. The system is further configured for generating a scene graph from the un-labelled graph, via the one or more hardware processors, using a trained Graph neural network with spatial message passing (GNN-SMP) based on a scene graph generation technique, wherein the scene graph generation technique comprises: optimizing the first object embedding to obtain an updated object embedding based on the trained GNN-SMP, generating a plurality of labelled objects from the updated object embedding and the un-labelled graph based on an object classification technique in the trained GNN-SMP, generating an edge embedding for each un-labelled edge in the un-labelled graph using the updated object embedding, generating a plurality of labelled edges from the edge embedding and the un-labelled graph based on an edge classification technique in the trained GNN-SMP and generating the scene graph from the un-labelled graph using the plurality of labelled objects and the plurality of labelled edges.

In another aspect, a method for scene graph generation is provided. The method includes receiving a plurality of inputs, wherein the plurality of inputs is associated with an image of a scene. The method further includes extracting a plurality of spatial features of the image, based on a feature extraction technique. The method further includes detecting a plurality of objects in the image using the plurality of spatial features based on an object detection technique, wherein the object detection technique comprises: localizing a set of bounding boxes in the image using the plurality of spatial features based on a bounding box technique; and extracting a first object embedding from each bounding box from the set of bounding boxes using the plurality of spatial features based on an object embedding technique, wherein a plurality of objects are represented using the set of bounding boxes and the first object embedding. The method further includes predicting a set of edge representations for the plurality of objects, using the plurality of spatial features based on a trained edge proposal neural network. The method further includes generating an un-labelled graph, based on an un-labelled graph generation technique, wherein the generation of the un-labelled graph comprises: generating a basic graph based on the set of bounding boxes and the set of edge representations using a linear assignment method and generating the un-labelled graph based on the basic graph using the plurality of objects, wherein the un-labelled graph comprises of a plurality of un-labelled objects and a plurality of un-labelled edges. The method further includes generating a scene graph from the un-labelled graph, using a trained Graph neural network with spatial message passing (GNN-SMP) based on a scene graph generation technique, wherein the scene graph generation technique comprises: optimizing the first object embedding to obtain an updated object embedding based on the trained GNN-SMP, generating a plurality of labelled objects from the updated object embedding and the un-labelled graph based on an object classification technique in the trained GNN-SMP, generating an edge embedding for each un-labelled edge in the un-labelled graph using the updated object embedding, generating a plurality of labelled edges from the edge embedding and the un-labelled graph based on an edge classification technique in the trained GNN-SMP and generating the scene graph from the un-labelled graph using the plurality of labelled objects and the plurality of labelled edges.

In yet another aspect, a non-transitory computer readable medium for scene graph generation is provided. The program includes receiving a plurality of inputs, wherein the plurality of inputs is associated with an image of a scene. The program further includes extracting a plurality of spatial features of the image, based on a feature extraction technique. The program further includes detecting a plurality of objects in the image using the plurality of spatial features based on an object detection technique, wherein the object detection technique comprises: localizing a set of bounding boxes in the image using the plurality of spatial features based on a bounding box technique; and extracting a first object embedding from each bounding box from the set of bounding boxes using the plurality of spatial features based on an object embedding technique, wherein a plurality of objects are represented using the set of bounding boxes and the first object embedding. The program further includes predicting a set of edge representations for the plurality of objects, using the plurality of spatial features based on a trained edge proposal neural network. The program further includes generating an un-labelled graph, based on an un-labelled graph generation technique, wherein the generation of the un-labelled graph comprises: generating a basic graph based on the set of bounding boxes and the set of edge representations using a linear assignment method and generating the un-labelled graph based on the basic graph using the plurality of objects, wherein the un-labelled graph comprises of a plurality of un-labelled objects and a plurality of un-labelled edges. The program further includes generating a scene graph from the un-labelled graph, using a trained Graph neural network with spatial message passing (GNN-SMP) based on a scene graph generation technique, wherein the scene graph generation technique comprises: optimizing the first object embedding to obtain an updated object embedding based on the trained GNN-SMP, generating a plurality of labelled objects from the updated object embedding and the un-labelled graph based on an object classification technique in the trained GNN-SMP, generating an edge embedding for each un-labelled edge in the un-labelled graph using the updated object embedding, generating a plurality of labelled edges from the edge embedding and the un-labelled graph based on an edge classification technique in the trained GNN-SMP and generating the scene graph from the un-labelled graph using the plurality of labelled objects and the plurality of labelled edges.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

Figure 1:
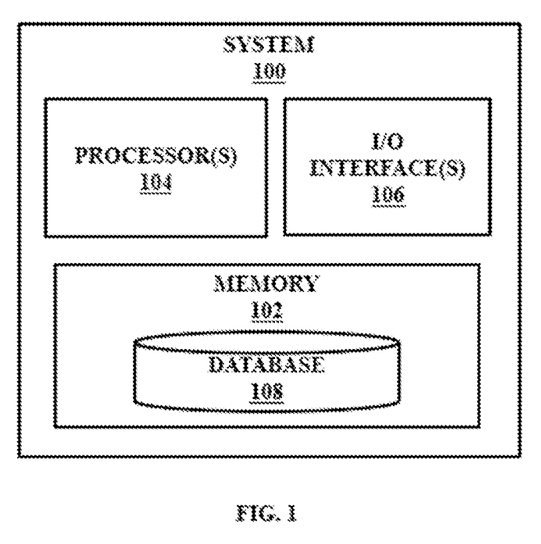
FIG. 1 illustrates an exemplary system for scene graph generation according to some embodiments of the present disclosure.

FIG. 1 is a functional block diagram of a system 100 for scene graph generation in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding image processing and a plurality of neural networks. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
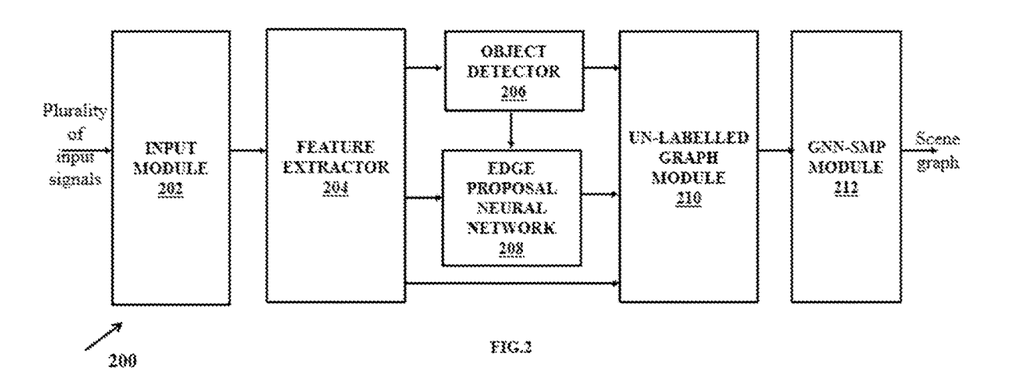
FIG. 2 is a block diagram depicting a functional overview of the system of FIG. 1 for scene graph generation according to some embodiments of the present disclosure.

Functions of the components of system 100 are explained in conjunction with functional overview of the system 100 in FIG. 2 and flow diagram of FIGS. 3A-3C and FIGS. 4A-4B for scene graph generation.

FIG. 2 is an example block diagram of the various modules of the system of FIG. 1, in accordance with some embodiments of the present disclosure. As depicted in the architecture, the FIG. 2 illustrates the functions of the modules of the system 100 that includes scene graph generation.

The system 200 for scene graph generation works in two modes—a training mode and a testing mode based on a user requirement. The training mode comprises of training the edge proposal neural network and the Graph neural network with spatial message passing (GNN-SMP), wherein the edge proposal neural network and the GNN-SMP is one of a deep neural network or a convolutional neural network (CNN). The testing mode comprises of using trained edge proposal neural network and the GNN-SMP for generating a scene graph of a scene/environment.

The system 200 for scene graph generation is configured to receive a plurality of inputs, using an input module 202, wherein the plurality of inputs is associated with an image of a scene. The system 200 further comprises a feature extractor 204 configured for extracting a plurality of spatial features of the image, based on a feature extraction technique. The system 200 further comprises an object detector 206 configured for detecting a plurality of objects in the image using the plurality of spatial features based on an object detection technique. The system 200 further comprises an edge proposal neural network 208 configured for predicting a set of edge representations using the plurality of spatial features based on a trained edge proposal neural network. The system 200 further comprises an un-labelled graph module 210 configured for generating an un-labelled graph based on an un-labelled graph generation technique. The system 200 further comprises an GNN-SMP module 212 configured for generating a scene graph from the un-labelled graph, using a trained Graph neural network with spatial message passing (GNN-SMP) based on a scene graph generation technique.

During training mode, the edge proposal neural network and the GNN-SMP is trained using several techniques. The training mode includes receiving a plurality of training inputs, via the input module 202 wherein the plurality of training inputs is associated with a mini-batch, wherein the mini-batch comprises a plurality of images of a plurality of scenes. The received plurality of training inputs are processed using several techniques including extracting a plurality of predicted spatial features of the plurality of training inputs, via the feature extractor 204, based on the feature extraction technique. Further a plurality of predicted objects is detected in the plurality of training inputs, via the object detector 206, using the plurality of predicted spatial features based on the object detection technique. Further a set of prediction edge representations is predicted for the plurality of predicted objects, via the edge proposal neural network 208, using the plurality of predicted spatial features based on an edge proposal neural network. Further, a predicted un-labelled graph is generated, via the un-labelled graph module 210, based on the un-labelled graph generation technique. Further a scene graph is generated from the predicted un-labelled graph, via the GNN-SMP module 212, using the scene graph generation. The edge proposal neural network and the GNN-SMP is updated based on the scene graph using a total training loss function to obtain the trained edge proposal neural network and the GNN-SMP.

The various modules of the system 100 and the block in FIG. 2 are configured for scene graph generation, and are implemented as at least one of a logically self-contained part of a software program, a self-contained hardware component, and/or, a self-contained hardware component with a logically self-contained part of a software program embedded into each of the hardware component that when executed perform the above method described herein.

Figure 3A:
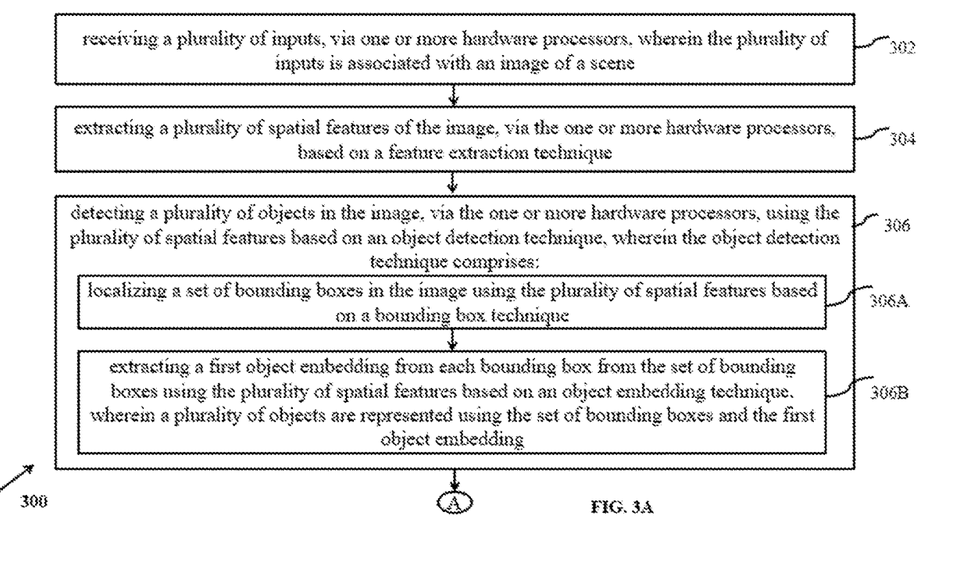
FIG. 3A, FIG. 3B and FIG. 3C is a flow diagram illustrating a method (300) for scene graph generation, by the system of FIG. 1, in accordance with some embodiments of the present disclosure.
Figure 3B:
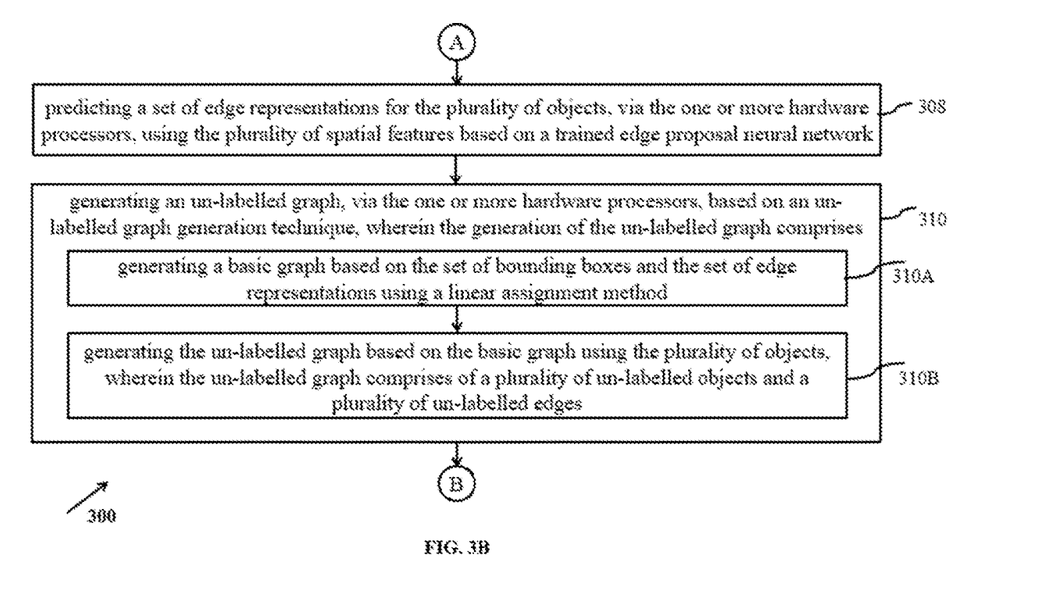
Figure 3C:
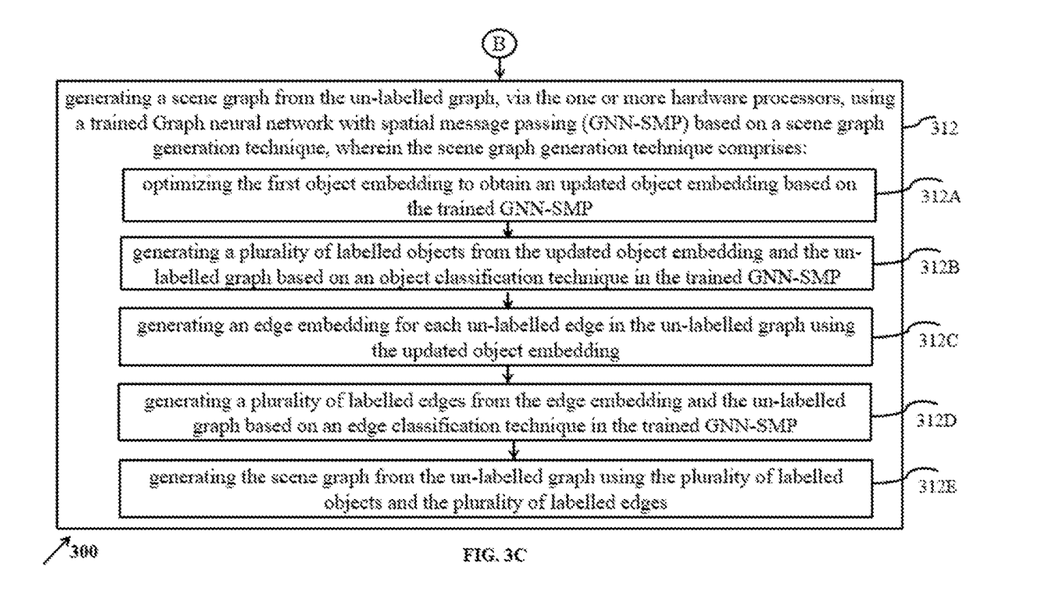

Functions of the components of the system 200 are explained in conjunction with functional modules of the system 100 stored in the memory 102 and further explained in conjunction with flow diagram of FIG. 3A, FIG. 3B and FIG. 3C. The FIG. 3A, FIG. 3B and FIG. 3C with reference to FIG. 1, is an exemplary flow diagram illustrating a method 300 for scene graph generation using the system 100 of FIG. 1 according to an embodiment of the present disclosure.

The steps of the method of the present disclosure will now be explained with reference to the components of the system 100 for scene graph generation and the modules 202-212 as depicted in FIG. 2 and the flow diagrams as depicted in the FIG. 3A, FIG. 3B and FIG. 3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of inputs is received in the input module 202. The plurality of inputs is associated with an image of a scene.

In an example scenario, an image of width (W) and height (H), is received at the input module 202. The image may include several image formats such as but not limited to a multi-spectral format or a 2-Dimensional array format.

At step 304 of the method (300), a plurality of spatial features of the image is extracted in the feature extractor 204. The plurality of spatial features is extracted based on a feature extraction technique.

In an embodiment, the feature extraction technique comprises one of a conventional image processing, deep neural network, and convolutional neural network. In an example scenario, the convolutional neural network uses 2D convolutional operator along with the non-linearity operator to extract spatial features corresponding to the input image. In an example scenario, the image (height (H) and width (W)), is fed to the feature extractor 204 to obtain the plurality of spatial features of dimension [Height=H/16, Width=W/16, Channels=512].

At step 306 of the method (300), a plurality of objects in the image is detected using the object detector 206. The plurality of objects is detected using the plurality of spatial features based on an object detection technique.

The object detection technique comprises of several steps as explained in below steps—306A and 306B.

At step 306A of the method (300), a set of bounding boxes is generated to localize objects in the image. The set of bounding boxes is generated using the plurality of spatial features based on a bounding box technique.

In an embodiment, the region of interest (bounding box) detection technique comprises one of a region proposal networks (RPN), and transformer neural network.

In an example scenario, for localization using the bounding box technique, a transformer neural network is used. The transformer neural network processes the extracted spatial features using the multi-attention layers, linear/dense layers, and the non-linearity layers, to output the regions of interest (example: set of bounding boxes). The set of bounding boxes generated in the object detector 206 is represented as shown below:

$$B=\{b_i | i=1 \text{ to } N\} \quad (1)$$

The format of the generated bounding box is $b_i=[x_c,y_c,w,h]$ where $(x_c,y_c)$ is the object center and w, h are the width and height of the localized object. Further, N represents the number of objects in an image.

At step 306B of the method (300), a first object embedding is extracted from each of the bounding boxes from the set of bounding boxes. The first object embedding is extracted using the plurality of spatial features based on an object embedding technique.

In an example scenario, a first object embedding is obtained for each bounding box in the set of bounding boxes, using a Region of Interest Alignment (ROIAlign) layer: This layer takes spatial features and the bounding box as input and generates the corresponding first object embedding.

$$x_i = \text{ROIAlign}(f, \hat{b}_i) \quad (2)$$

where, $x_i$ is the first object embedding of the $i^{th}$ localized object with bounding box $\hat{b}_i = [x_{min}, y_{min}, x_{max}, y_{max}]$ (xyxy format) and $$f \in \mathbb{R}^{\frac{H}{16} \times \frac{W}{16} \times 512}$$

is the spatial features.

The plurality of objects is represented using the set of bounding boxes and their corresponding first object embedding. In an embodiment, the plurality of objects is represented as:

$$\text{Plurality of Objects}=\{\text{object}_i | i=1 \text{ to } N\} \quad (3)$$

where $\text{object}_i(\hat{b}_i, x_i)$

At step 308 of the method (300), a set of edge representations is predicted for the plurality of objects in the edge proposal neural network 208. The set of edge representations is predicted using the plurality of spatial features based on a trained edge proposal neural network.

In an embodiment, the edge proposal neural network is one of a deep neural network or a convolutional neural network (CNN).

In order to uniquely represent and associate edges with the object, two schemes are considered. In the first scheme, each edge is represented by the center location of the originating and destination objects as shown below:

$$e_{i,j}=[x_c^i, y_c^i, x_c^j, y_c^j] \quad (4)$$

In the second scheme, a center location is considered along with the width and height information of the object pair as shown below:

$$e_{i,j}=[x_c^i-x_c^j, y_c^i-y_c^j, w^i-w^j, h^i-h^j] \quad (5)$$

The Table 1 shows the architecture of the edge proposal neural network (G);

TABLE 1

Architecture of the edge proposal neural network

| Layer | Filter size | For Conv2d: No. filters For FC: Output Neurons | Input feature size | Output feature size |
|---|---|---|---|---|
| Relu + BN + Conv2d | 1 × 1 | 512 | Spatial features: [50 × 50 × 512] | [50 × 50 × 512] |
| MaxPool | 2 × 2 | — | [50 × 50 × 512] | [25 × 25 × 512] |
| Relu + BN + Conv2d | 1 × 1 | 1024 | [25 × 25 × 512] | 25 × 25 × 1024] |
| Reshape | — | — | [25 × 25 × 1024] | [625 × 1024] |
| Matrix Transformation | — | — | [625 × 1024] | [100 × 1024] |
| Relu + FC | — | 512 | [100 × 1024] | [100 × 512] |
| Relu + FC | — | 256 | [100 × 512] | [100 × 256] |
| Tanh + FC | — | 4 | [100 × 256] | Edge representations [100 × 4] |

The edge proposal neural network (G) takes spatial features (f) as an input and predicts a set of edge representations ($\hat{E}^{PRED}$) as shown:

$$\hat{E}^{PRED}=G(f;\theta_G) \quad (6)$$

The initial two-dimensional convolution layers (with BatchNormalization, and ReLu activation) of the edge proposal neural network reduces the spatial dimension of the spatial features. The reduced spatial features are resized and transformed using a learnable matrix M. The predicted set of edge representations is obtained by feeding the transformed features to fully connected layers. Where, $\hat{E}^{PRED} \in R^{M \times 4}$ is the predicted set of edge representation with M edges and $\theta_G$ represents the parameters of the edge proposal neural network. In an example scenario—a maximum number of edges to be predicted is M=100.

At step 310 of the method (300), an un-labelled graph is generated in the un-labelled graph module 210. The un-labelled graph is generated based on an un-labelled graph generation technique, wherein the generation of the un-labelled graph comprises of several steps explained below using steps 310A to 310B.

At step 310A of the method (300), a basic graph is generated. The basic graph is generated using a linear assignment method based on the set of bounding boxes and the set of edge representations.

In an embodiment, the linear assignment method comprises a Hungarian algorithm. The Hungarian algorithm optimizes Eq. (9) to associate the predicted edge representation with the localized object pair. While training, the ground-truth edge set for edge association ($\hat{E}^{GT}$) given by equation (7) is used. During testing mode, the potential edge set ($\hat{E}^{POT}$) is constructed and edge association is performed between the predicted edge set and the potential edge set as shown below:

$$\pi = \underset{\pi \in \Pi_M}{\operatorname{argmin}} \sum_{k=1}^{M} l_1\left(\hat{E}_k^{GT}, \hat{E}_{\pi(k)}^{PRED}\right) \quad (7)$$

where $l_1(\hat{E}_k^{GT}, \hat{E}_{\pi(k)}^{PRED})$ is the pairwise $l_1$ loss between the elements of the ground-truth edge set and the predicted edge set.

$$\hat{E}^{POT} = \{e_{i,j} \mid (i, j) \in V^2 \text{ and } i \neq j\} \quad (8)$$

$$\pi = \underset{\pi \in \Pi_M}{\operatorname{argmin}} \sum_{k=1}^{M} l_1\left(\hat{E}_k^{POT}, \hat{E}_{\pi(k)}^{PRED}\right) \quad (9)$$

Note on hyper-parameter M: The hyper-parameter M denotes the size of the predicted edge set. Smaller values of M would lead to missing edges in the constructed un-labeled scene graph. Large values of M would introduce spurious edges in the constructed un-labeled scene graph. Therefore, an optimal value for M is chosen, and dependent dataset. In an example scenario—M is set to 100 for the visual genome dataset 150 (VG-150) dataset (as disclosed in "Krishna, Ranjay, Yuke Zhu, Oliver Groth, Justin Johnson, Kenji Hata, Joshua Kravitz, Stephanie Chen et al. "Visual genome: Connecting language and vision using crowdsourced dense image annotations." International journal of computer vision 123, no. 1 (2017): 32-73).

At step 310B of the method (300), the un-labelled graph is generated based on the basic graph using the plurality of objects. The un-labelled graph comprises of a plurality of un-labelled objects and a plurality of un-labelled edges.

In an embodiment, the un-labelled graph is constructed as expressed below:

un-labelled graph=Graph(plurality of un-labelled objects, plurality of un-labelled edges) (10)

Where, the plurality of un-labelled edges=$\hat{E}_\pi^{PRED}$

At step 312 of the method (300), a scene graph is generated from the un-labelled graph in the GNN-SMP module 212. The scene graph is generated using a trained Graph neural network with spatial message passing (GNN-SMP) based on a scene graph generation technique.

The scene graph generation technique comprises several steps that are explained in the below section using steps 312A-312E.

At step 312A of the method (300), the first object embedding is optimized to obtain an updated object embedding based on the trained GNN-SMP.

In an embodiment, considering an example scenario—if the set of bounding boxes for objects in the image I is represented as $B=\{b_1, \ldots, b_N\}$ and $X=\{x_1, \ldots, x_N\}$, be the set of first object embeddings, where $x_i$ represents the first object embedding of the $i^{th}$ localized object with bounding box $b_i$. The GNN-SMP takes the first object embedding as input and outputs the updated object embedding as follows:

$$x_i^{new} = \phi\left(W_1 \sum_{j \in N_i} s(b_i, b_j) \cdot \hat{x}_j + W_2 \cdot \hat{x}_i\right) \quad (11)$$

where, $\hat{x}_j$ = concatenation $(x_j, b_j)$ $\hat{x}_i$ = concatenation $(x_i, b_i)$ Here, $x_i^{new}$ represents the updated object embedding corresponding to the $i^{th}$ object, $\phi$ represents non-linearity function (e.g., relu), W1 and W2 represents the trainable transformation matrix, Ni represents the set of neighbours of object (node) i, and s represents spatial score function. Spatial score function takes bounding box information of $i^{th}$ and $j^{th}$ object to generate a real positive number between 0 to 1.

At step 312B of the method (300), a plurality of labelled objects is generated from the updated object embedding and the un-labelled graph. The plurality of labelled objects is generated based on an object classification technique in the trained GNN-SMP.

In an embodiment, the updated object embedding ($x_i^{new}$) is fed to a node classifier network (a fully connected neural network with parameters ($\theta_{node}$) in the GNN-SMP to obtain the labelled objects is given by:

$$O_i^{pred} = h_{node}(x_i^{new}; \theta_{node}) \quad (12)$$

Here, $O_i^{pred}$ represents the label of the $i^{th}$ object (node).

At step 312C of the method (300), an edge embedding is generated for each un-labelled edge in the un-labelled graph using the updated object embedding.

An edge embedding ($z_{ij}$) of an edge ($e_{ij}$) is obtained by concatenation of the updated object embeddings associated with the un-labelled edge as shown below:

$$z_{ij} = \text{Concatenation}(x_i, x_j) \quad (13)$$

At step 312D of the method (300), a plurality of labelled edges is generated from the edge embedding and the un-labelled graph. The plurality of labelled edges is generated based on an edge classification technique in the trained GNN-SMP.

In an embodiment, the generated edge is fed to an edge classifier ($h_{rel}$) in the GNN-SMP to obtain the edge label ($R_k^{pred}$), given as shown below:

$$R_k^{pred} = h_{rel}(z_{ij}; \theta_{rel}) \quad (14)$$

Here, $R_k^{pred}$ represents the label of the edge between $i^{th}$ and $j^{th}$ object.

At step 312E of the method (300), a scene graph is generated from the un-labelled graph using the plurality of labelled objects and the plurality of labelled edges.

In an embodiment, the generation of the scene graph from the un-labelled graph is represented as shown below:

Scene graph=graph(plurality of objects, plurality of edges, plurality of object labels, plurality of edge labels) (15)

The scene graph is generated using several steps as described above based on the trained edge proposal neural network and the trained GNN-SMP. The proposed system is trained on a dataset containing natural images and their corresponding ground truth scene graphs. The ground truth scene graph contains:

(a) Ground truth class labels of nodes (objects),
(b) Ground truth set of bounding boxes,
(c) Ground truth class labels of edges (relationships), and
(d) Ground truth set of edge representations.

In an example scenario, for experiment purposes—the edge proposal neural network and the GNN-SMP is trained in an end-to-end manner using the Adam optimizer with a learning rate of 1e-4, and a mini-batch size of 4 images for epochs. At each training iteration.

Figure 4A:
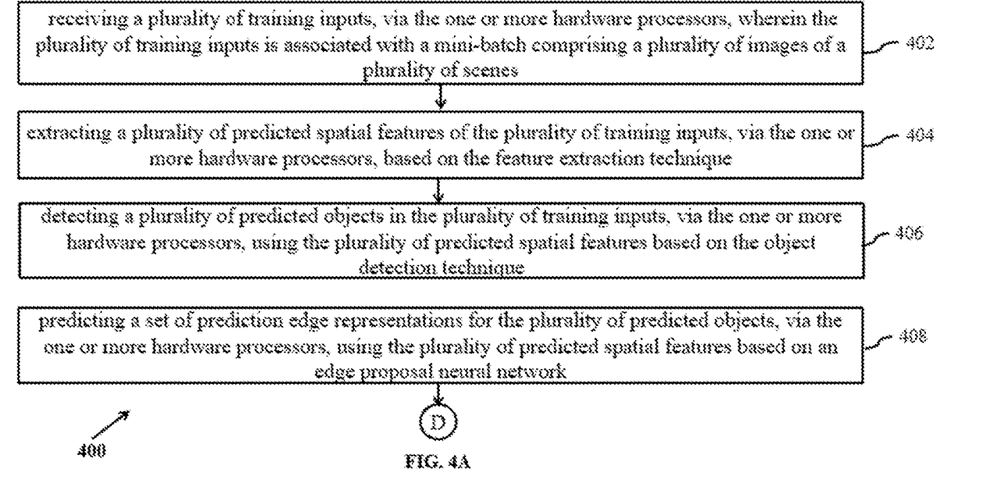
FIG. 4A and FIG. 4B is a flow diagram illustrating a method (400) for training an edge proposal neural network and the Graph neural network with spatial message passing (GNN-SMP), by the system of FIG. 1, in accordance with some embodiments of the present disclosure.
Figure 4B:
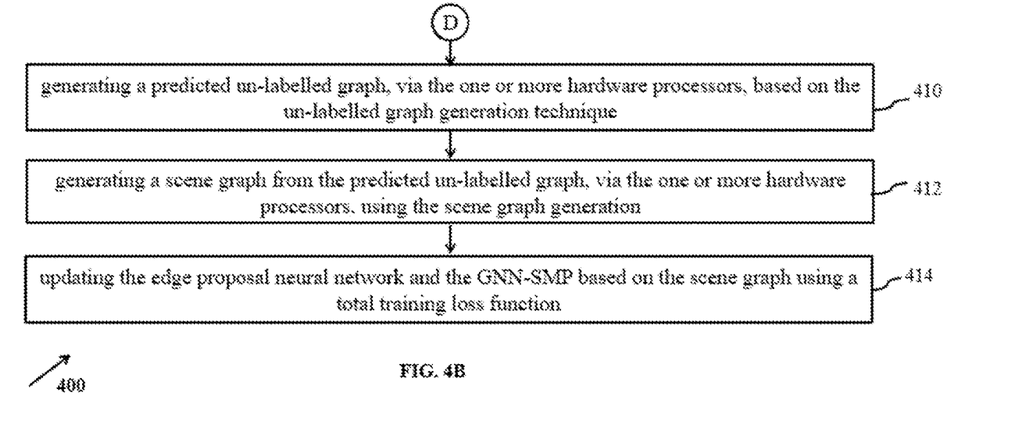

In an embodiment, the method for the training the edge proposal neural network and the GNN-SMP comprises is explained using flowchart of 400 as depicted in FIG. 4A and FIG. 4B. The training of the edge proposal neural network and the GNN-SMP comprises:

At step 402 of the method (400), a plurality of training inputs is received in the input module 202. The plurality of training inputs is associated with a mini-batch, wherein the mini-batch comprises a plurality of images of a plurality of scenes.

In an embodiment, a mini-batch comprises a user defined number of images corresponding to the scenes. In an example scenario the mini-batch includes 10 images.

At step 404 of the method (400), a plurality of predicted spatial features of the plurality of training inputs is extracted in the feature extractor 204. The plurality of predicted spatial features is extracted based on the feature extraction technique.

In an embodiment, the feature extraction technique comprises one of a conventional image processing, deep neural network, and convolutional neural network. In an example scenario, the convolutional neural network uses 2D convolutional operator along with the non-linearity operator to extract spatial features corresponding to the input training image.

At step 406 of the method (400), a plurality of predicted objects in the plurality of training inputs is detected in the object detector 206. The plurality of predicted objects is detected using the plurality of predicted spatial features based on the object detection technique.

In an embodiment, the object detection technique comprises of several steps including the bounding box technique and the object embedding technique as described using the flowchart of method 300.

At step 408 of the method (400), a set of prediction edge representations is predicted for the plurality of predicted objects using the edge proposal neural network 208. The set of prediction edge representations is predicted using the plurality of predicted spatial features based on an edge proposal neural network.

In an embodiment, the edge proposal neural network is one of a deep neural network or a convolutional neural network (CNN).

To train the edge proposal neural network, a ground-truth set of edges ($\hat{E}^{GT}$) is shared below:

$$\hat{E}^{GT}=\{e_{i,j}|(i,j)\in V^2 \text{ and } j\in N(i)\} \quad (16)$$

where,

N (i) is the set of neighbors of node i.

Node j is said to be neighbour of node i if there exists an edge (relationship) from node i to node j.

The procedure to compute a training loss associated with the edge proposal neural network includes linear assignment between the predicted set of edge representation and the ground truth set of edge representation using the Hungarian algorithm to find the permutation of M elements as shown below:

$$\pi = \underset{\pi \in \Pi_M}{\mathrm{argmin}} \sum_{k=1}^{M} l_1\left(\hat{E}_k^{GT}, \hat{E}_{\pi(k)}^{PRED}\right) \quad (7)$$

where $l_1(\hat{E}_k^{GT}, \hat{E}_{\pi(k)}^{PRED})$ is the pairwise $l_1$ loss between the elements of the ground-truth set and the predicted set.

Post matching, the training loss ($\mathcal{L}_{edge}$) for the edge proposal neural network is given by:

$$\mathcal{L}_{edge} = \sum_{k=1}^{M} l_1\left(\hat{E}_k^{GT}, \hat{E}_{\pi(k)}^{PRED}\right) \quad (17)$$

At step 410 of the method (400), an un-labelled graph is predicted in the un-labelled graph module 210. The un-labelled graph is predicted based on the un-labelled graph generation technique.

In an embodiment, the un-labelled graph generation technique comprises of several steps including generation of a basic graph using a linear assignment method and generation of an un-labelled graph based on the basic graph using the plurality of objects.

At step 412 of the method (400), a scene graph is generated from the predicted un-labelled graph in the GNN-SMP module 212. The scene graph is generated using the scene graph generation technique.

In an embodiment, scene graph generation technique includes optimizing the first object embedding to obtain an updated object embedding, generating a plurality of labelled objects from the updated object embedding and the un-labelled graph based on the object classification technique in the GNN-SMP, generating an edge embedding for each un-labelled edge in the un-labelled graph using the updated object embedding, generating a plurality of labelled edges from the edge embedding and the un-labelled graph based on an edge classification technique in the GNN-SMP and generating a scene graph from the un-labelled graph using the plurality of labelled objects and the plurality of labelled edges.

At step 414 of the method (400), updating the edge proposal neural network and the GNN-SMP based on the scene graph using a total training loss function to obtain the trained edge proposal neural network and the trained GNN-SMP.

In an embodiment, the total training loss function for the edge proposal neural network is explained in step 408 using equation 17—and used for training the edge proposal neural network to obtain the trained edge proposal neural network The GNN-SMP comprises the node classifier and the edge classifier which are trained with the total training loss function. The training loss associate with the node classifier is given by:

$$\mathcal{L}_{node} = \sum_{i=1}^{|O|} CE(O_i^{pred}, O_i) \qquad (18)$$

The training loss associated with the edge classifier is given by:

$$\mathcal{L}_{rel} = \sum_{k=1}^{|R|} CE(R_k^{pred}, R_k) \qquad (19)$$

The node classifier and the edge classifier are jointly trained and the corresponding training loss is given as shown below:

$$\mathcal{L}_{cls} = \mathcal{L}_{node} + \mathcal{L}_{rel} \qquad (20)$$

In an example scenario, Faster-RCNN (object detection technique and object embedding technique—as disclosed in "S. Ren, K. He, R. Girshick, and J. Sun, "Faster r-cnn: Towards real-time object detection with region proposal networks," Advances in neural information processing systems, vol. 28, pp. 91-99, 2015") with VGG16 backbone (feature extraction technique as disclosed in "K. Simonyan and A. Zisserman, "Very deep convolutional networks for large-scale image recognition," arXiv preprint arXiv: 1409.1556, 2014.") is used to train the edge proposal neural network and the GNN-SMP on VG-150 dataset and freeze its weights.

Experiments

Experiments had been conducted for the disclosed Scene Graph Generation network/method or invention and are implemented using PyTorch deep learning library. The experiments are performed on the NVidia Tesla V100 GPU machine. The disclosed method is trained for 10 epochs using the Adam optimizer with a learning rate of 0.0001. The Recall@50, Recall@100, and computational load (Tau) metrics are used for the evaluation of the disclosed method and are compared with the existing state-of-the-art methods.

The evaluation results are summarized in Table-2. The last row shows the performance of the disclosed method. It achieves a Recall@50=27.6 (higher the better), Recall@100=34.3 (higher the better). The Recall@100 of the disclosed method is much better than the existing methods. Furthermore, the computational load (τ) (lower the better) of the method is upper bounded by the hyperparameter (user-defined) M and is equal to 100. Whereas the computation load of the existing methods is much higher than the disclosed method.

TABLE 2

Comparison of various scene graph generation methods. Here, N represents the number of objects in the input image.

| Methods | Recall@50 | Recall@100 | Computational load (τ) | For N = 20, 30 |
|---|---|---|---|---|
| IMP | 20.6 | 22.4 | N(N − 1) | 380, 870 |
| MSDN | 27.6 | 29.9 | N(N − 1) | 380, 870 |
| NM-Freq | 23.8 | 27.2 | N(N − 1) | 380, 870 |
| Graph R-CNN | 29.6 | 31.6 | N(N − 1) | 380, 870 |
| Proposed | 27.6 | 34.3 | M | 100 |

TABLE 2-continued

Comparison of various scene graph generation methods. Here, N represents the number of objects in the input image.

The techniques for the scene graph generation methods—IMP as disclosed in "D. Xu, Y. Zhu, C. B. Choy, and L. Fei-Fei, "Scene graph generation by iterative message passing," in Proceedings of the IEEE conference on CVPR, 2017, pp. 5410-5419." The techniques for the scene graph generation methods—MSDN as disclosed in "Y. Li, W. Ouyang, B. Zhou, K. Wang, and X. Wang, "Scene graph generation from objects, phrases and region captions," in Proceedings of the IEEE ICCV, 2017, pp. 1261-1270.". The techniques for the scene graph generation methods—NM-Freq as disclosed in "R. Zellers, M. Yatskar, S. Thomson, and Y. Choi, "Neural motifs: Scene graph parsing with global context," in Proceedings of the IEEE Conference on CVPR, 2018, pp. 5831-5840.". The techniques for the scene graph generation methods—Graph R-CNN "J. Yang, J. Lu, S. Lee, D. Batra, and D. Parikh, "Graph r-cnn for scene graph generation," in ECCV, 2018, pp. 670-685."

The unique advantage of the disclosed method is that it is computationally efficient and achieves good performance when compared to existing methods. Instead of detecting the presence of relationships for all object pairs, the disclosed methods directly generate the set of edges. Whereas existing methods process each pair of localized objects for detection and classification of the relationships between objects. Such methods are computationally intensive. Since scene graphs of images are spares in nature i.e., only a few localized objects will have some type of relationship between them.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide an improved solution to address a problem of scene graph generation. Scene graph captures rich semantic information of an image by representing objects and their relationships as nodes and edges of a graph and has several applications including image retrieval, action recognition, visual question answering, autonomous driving, robotics. However, to leverage scene graphs, computationally efficient scene graph generation methods are required, which is very challenging to generate due presence of a quadratic number of potential edges and computationally intensive/non-scalable techniques for detecting the relationship between each object pair using the traditional approach. The disclosure proposes a combination of edge proposal neural network and the Graph neural network with spatial message passing (GNN-SMP) along with several techniques including a feature extraction technique, object detection technique, un-labelled graph generation technique and a scene graph generation technique to generate scene graphs.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving a plurality of inputs, via one or more hardware processors, wherein the plurality of inputs is associated with an image of a scene;
extracting a plurality of spatial features of the image, via the one or more hardware processors, based on a feature extraction technique;
detecting a plurality of objects in the image, via the one or more hardware processors, using the plurality of spatial features based on an object detection technique, wherein the object detection technique comprises:
    localizing a set of bounding boxes in the image using the plurality of spatial features based on a bounding box technique; and
    extracting a first object embedding from each bounding box from the set of bounding boxes using the plurality of spatial features based on an object embedding technique, wherein a plurality of objects are represented using the set of bounding boxes and the first object embedding;
predicting a set of edge representations for the plurality of objects, via the one or more hardware processors, using the plurality of spatial features based on a trained edge proposal neural network;
generating an un-labelled graph, via the one or more hardware processors, based on an un-labelled graph generation technique, wherein the generation of the un-labelled graph comprises:
    generating a basic graph based on the set of bounding boxes and the set of edge representations using a linear assignment method; and
    generating the un-labelled graph based on the basic graph using the plurality of objects, wherein the un-labelled graph comprises of a plurality of un-labelled objects and a plurality of un-labelled edges; and
generating a scene graph from the un-labelled graph, via the one or more hardware processors, using a trained Graph neural network with spatial message passing (GNN-SMP) based on a scene graph generation technique, wherein the scene graph generation technique comprises:
    optimizing the first object embedding to obtain an updated object embedding based on the trained GNN-SMP;
    generating a plurality of labelled objects from the updated object embedding and the un-labelled graph based on an object classification technique in the trained GNN-SMP;
    generating an edge embedding for each un-labelled edge in the un-labelled graph using the updated object embedding;
    generating a plurality of labelled edges from the edge embedding and the un-labelled graph based on an edge classification technique in the trained GNN-SMP; and generating the scene graph from the un-labelled graph using the plurality of labelled objects and the plurality of labelled edges.

2. The method of claim 1, a process of training the edge proposal neural network and the GNN-SMP comprises:
receiving a plurality of training inputs, via the one or more hardware processors, wherein the plurality of training inputs is associated with a mini-batch comprising a plurality of images of a plurality of scenes;
extracting a plurality of predicted spatial features of the plurality of training inputs, via the one or more hardware processors, based on the feature extraction technique;
detecting a plurality of predicted objects in the plurality of training inputs, via the one or more hardware processors, using the plurality of predicted spatial features based on the object detection technique;
predicting a set of prediction edge representations for the plurality of predicted objects, via the one or more hardware processors, using the plurality of predicted spatial features based on an edge proposal neural network;
generating a predicted un-labelled graph, via the one or more hardware processors, based on the un-labelled graph generation technique;
generating a scene graph from the predicted un-labelled graph, via the one or more hardware processors, using the scene graph generation; and
updating the edge proposal neural network and the GNN-SMP based on the scene graph using a total training loss function to obtain the trained edge proposal neural network and the trained GNN-SMP.

3. The method of claim 2, wherein the total training loss function is computed based on an object localization loss, an edge representation loss, a node classification loss, and an edge classification loss.

4. The method of claim 1, wherein the feature extraction technique comprises one of a conventional image processing, a deep learning, and an image feature extraction technique.

5. The method of claim 1, the bounding box technique comprises one of a Faster Region-Convolutional Neural Network—Faster R-CNN and the object embedding technique.

6. The method of claim 1, wherein the edge proposal neural network is one of a deep neural network or a convolutional neural network (CNN).

7. The method of claim 1, wherein the linear assignment technique comprises a Hungarian algorithm.

8. A system, comprising:
a memory storing instructions;
one or more communication interfaces; and
one or more hardware processors coupled to the memory via the one or more communication interfaces, wherein the one or more hardware processors are configured by the instructions to:
receive a plurality of inputs, via one or more hardware processors, wherein the plurality of inputs is associated with an image of a scene;
extract a plurality of spatial features of the image, via the one or more hardware processors, based on a feature extraction technique;
detect a plurality of objects in the image, via the one or more hardware processors, using the plurality of spatial features based on an object detection technique, wherein the object detection technique comprises:
localizing a set of bounding boxes in the image using the plurality of spatial features based on a bounding box technique; and
extracting a first object embedding from each bounding box from the set of bounding boxes using the plurality of spatial features based on an object embedding technique, wherein a plurality of objects are represented using the set of bounding boxes and the first object embedding;
predict a set of edge representations for the plurality of objects, via one or more hardware processors, using the plurality of spatial features based on a trained edge proposal neural network;
generate an un-labelled graph, via one or more hardware processors, based on an un-labelled graph generation technique, wherein the generation of the un-labelled graph comprises:
generating a basic graph based on the set of bounding boxes and the set of edge representations using a linear assignment method; and
generating the un-labelled graph based on the basic graph using the plurality of objects, wherein the un-labelled graph comprises of a plurality of un-labelled objects and a plurality of un-labelled edges; and
generating a scene graph from the un-labelled graph, via one or more hardware processors, using a trained Graph neural network with spatial message passing (GNN-SMP) based on a scene graph generation technique, wherein the scene graph generation technique comprises:
optimizing the first object embedding to obtain an updated object embedding based on the GNN-SMP;
generating a plurality of labelled objects from the updated object embedding and the un-labelled graph based on an object classification technique in the GNN-SMP;
generating an edge embedding for each un-labelled edge in the un-labelled graph using the updated object embedding;
generating a plurality of labelled edges from the edge embedding and the un-labelled graph based on an edge classification technique in the GNN-SMP; and
generating the scene graph from the un-labelled graph using the plurality of labelled objects and the plurality of labelled edges.

9. The system of claim 8, wherein the process of training the edge proposal neural network and the GNN-SMP comprises:
receive a plurality of training inputs, via the one or more hardware processors, wherein the plurality of training inputs is associated with a mini-batch comprising a plurality of images of a plurality of scenes;
extract a plurality of predicted spatial features of the plurality of training inputs, via the one or more hardware processors, based on the feature extraction technique;
detect a plurality of predicted objects in the plurality of training inputs, via the one or more hardware processors, using the plurality of predicted spatial features based on the object detection technique;
predict a set of prediction edge representations for the plurality of predicted objects, via the one or more hardware processors, using the plurality of predicted spatial features based on an edge proposal neural network;

generate a predicted un-labelled graph, via the one or more hardware processors, based on the un-labelled graph generation technique;
generate a scene graph from the predicted un-labelled graph, via the one or more hardware processors, using the scene graph generation technique;
updating the edge proposal neural network and the GNN-SMP based on the scene graph using a total training loss function to obtain the trained edge proposal neural network and the trained GNN-SMP.

10. The system of claim 8, wherein the feature extraction technique comprises one of a conventional image processing, a deep learning, and an image feature extraction technique.

11. The system of claim 8, wherein the bounding box technique comprises one of a Faster Region-Convolutional Neural Network—Faster R-CNN and the object embedding technique.

12. The system of claim 8, wherein the edge proposal neural network is one of a deep neural network or a convolutional neural network (CNN).

13. The system of claim 8, wherein the linear assignment technique comprises a Hungarian algorithm.

14. The system of claim 8, wherein the total training loss function is computed based on an object localization loss, an edge representation loss, a node classification loss and an edge classification loss.

15. One or more non-transitory machine readable information storage mediums comprising one or more instructions which when executed by one or more hardware processors cause:
    receiving a plurality of inputs, wherein the plurality of inputs is associated with an image of a scene;
    extracting a plurality of spatial features of the image, based on a feature extraction technique;
    detecting a plurality of objects in the image using the plurality of spatial features based on an object detection technique, wherein the object detection technique comprises
        localizing a set of bounding boxes in the image using the plurality of spatial features based on a bounding box technique; and
        extracting a first object embedding from each bounding box from the set of bounding boxes using the plurality of spatial features based on an object embedding technique, wherein a plurality of objects are represented using the set of bounding boxes and the first object embedding;
    predicting a set of edge representations for the plurality of objects using the plurality of spatial features based on a trained edge proposal neural network;
    generating an un-labelled graph based on an un-labelled graph generation technique, wherein the generation of the un-labelled graph comprises:
        generating a basic graph based on the set of bounding boxes and the set of edge representations using a linear assignment method; and
        generating the un-labelled graph based on the basic graph using the plurality of objects, wherein the un-labelled graph comprises of a plurality of un-labelled objects and a plurality of un-labelled edges; and
    generating a scene graph from the un-labelled graph, via the one or more hardware processors, using a trained Graph neural network with spatial message passing (GNN-SMP) based on a scene graph generation technique, wherein the scene graph generation technique comprises:
        optimizing the first object embedding to obtain an updated object embedding based on the trained GNN-SMP;
        generating a plurality of labelled objects from the updated object embedding and the un-labelled graph based on an object classification technique in the trained GNN-SMP;
        generating an edge embedding for each un-labelled edge in the un-labelled graph using the updated object embedding;
        generating a plurality of labelled edges from the edge embedding and the un-labelled graph based on an edge classification technique in the trained GNN-SMP; and
        generating the scene graph from the un-labelled graph using the plurality of labelled objects and the plurality of labelled edges.

* * * * *